United States Patent [19]

Sancaktar

[11] Patent Number: 4,806,400
[45] Date of Patent: Feb. 21, 1989

[54] TAPERED ADHESIVE TAPE
[75] Inventor: Erol Sancaktar, Potsdam, N.Y.
[73] Assignee: The Kendall Company, Boston, Mass.
[21] Appl. No.: 867,110
[22] Filed: May 23, 1986
[51] Int. Cl.⁴ .............................................. B32B 23/02
[52] U.S. Cl. ............................ 428/35.9; 428/57;
428/58; 428/60; 428/61; 428/192; 428/343;
428/355; 428/356
[58] Field of Search ............... 428/57, 60, 194, 356,
428/36, 58, 61, 192, 343, 355; 138/144, 150,
154; 156/187, 195

[56] References Cited
U.S. PATENT DOCUMENTS 1,287,945  12/1918  Ford ................................. 138/150
2,129,110   9/1938  Weaver ............................. 428/60
3,024,153   3/1962  Kennedy .......................... 138/144
4,287,245   9/1981  Kikuch ............................. 428/60

FOREIGN PATENT DOCUMENTS 261724  11/1927  United Kingdom ............... 428/60
922746   4/1963  United Kingdom ............... 428/60

Primary Examiner—Ellis P. Robinson
Assistant Examiner—P. R. Schwartz
Attorney, Agent, or Firm—Alvin Isaacs

[57] ABSTRACT

In a system for protecting metal objects, e.g. pipes intended for inground implantation, from corrosion and/or other degradative forces by wrapping an adhesive tape over the surface thereof, the improvement wherein opposed edges of the tape are tapered.

13 Claims, 4 Drawing Sheets

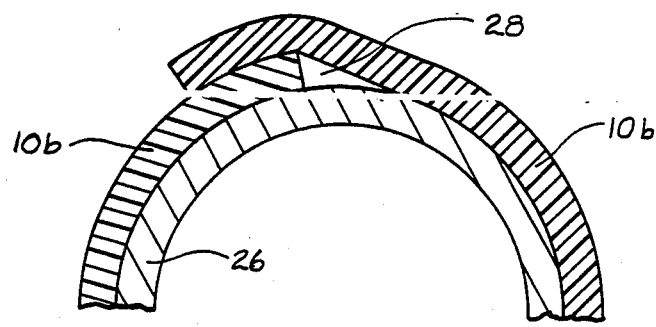
_FIG. 8_
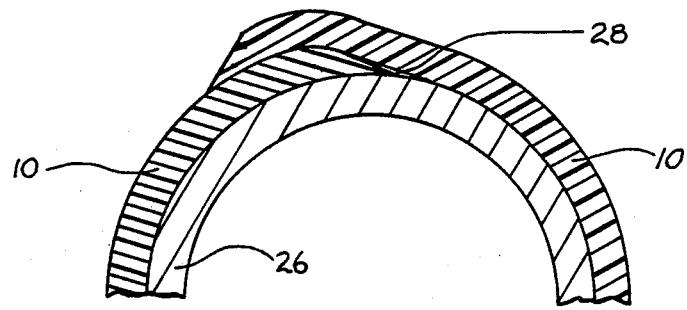
_FIG. 9_

TAPERED ADHESIVE TAPE

This invention relates to adhesive tapes of generally known composition and, more particularly, to pressure-sensitive adhesive tapes of the type which may be employed to wrap metal objects such as pipes or other tubular articles. Since the invention is primarily directed to anti-corrosion pipewraps for pipelines destined for inground implantation, it will be described hereinafter for purposes of illustration by reference thereto.

BACKGROUND OF THE INVENTION

In order to prevent corrosion and/or other degradative forces from attacking pipelines, it is common practice to apply a protective cover to the surface of the pipe. While in its simplest form, this protective cover could be an anti-corrosion coating, for optimum longevity, especially for inground pipelines, the protective system will at least consist of an outer adhesive tape which is typically spirally wound around the pipe.

In a typical anti-corrosion system currently in use, a primer coating is first applied to the surface of the pipe and over this primer coating a pressure-sensitive tape having tough, abrasion-resistant backing is then wound. In some systems, a second tape is applied over the first tape.

Anti-corrosion protective tapes that are applied to inground pipeline structures are often subjected to rather severe long-term shearing forces derive from the surrounding soil. The magnitude of these shearing forces depends on several factors, including amongst others: (a) the type of soil, (b) the tectonic forces surrounding the implanted pipeline, (c) the size of the pipe, (d) the axial site emplacement and (e) the range of thermal expansion as well as its contents.

In order to understand how each of the above factors affected the overall shear stress imparted on an inground pipeline tape, we first shall consider the forces acting upon implanted pipelines.

Frictional forces acting between the pipeline anti-corrosion protective tape and the surrounding soil are the primary source of shear stress. Frictional forces are here defined as the product of the frictional coefficient between the pipeline coating and the soil and the normal forces acting upon the pipe. As the coefficient of friction depends upon both the nature of the pipeline coating as well as the surrounding soil, it will be found to vary in different applications. Olefin polymer pipeline protective coatings, such as polyethylene, or the like, inherently exhibit lower coefficients of friction, as the protective tape outer surfaces are smooth and substantially non-adherent.

Other factors having importance in these considerations are the weight of the pipe, including its contents. In addition, since the normal force will vary depending on the axial position around the pipe diameter, the frictional force and hence the shearing forces will also be found to vary around the diameter of the pipe.

The result of the long-term shear forces on a pipeline protective coating is referred to as "soil stress". Soil stress on an anti-corrosion protective coating generally results from the structural shear forces which cause the protective coating to creep along the pipeline peripheral surface.

Creep is, in essence, a long-term visco-elastic, or "cold-flow" phenomenon, common to all polymeric substances, The amount of creep, will depend upon physical properties of a coating. Since the physical properties (i.e. modulus) of a coating will be temperature dependent, temperature becomes a decisive element in determining the amount of creep. At low temperatures, the propensity of the protective coating to creep will be substantially reduced, while at elevated temperatures, the likelihood of creep will be significantly increased, other factors remaining the same.

The prior art has addressed these problems with various chemical approached directed to improving the cohesive nature of the adhesive, thereby increasing resistance to shear and creep.

Irrespective of the improvements provided by modifications of the chemical nature of the adhesive composition, it can be said that still further improvements in the protective tape system are desirable.

The present invention can in essence be described as a physical rather than chemical modification of the tape structure to achieve an improved pipewrap independent of the chemical components of adhesive itself.

The task of the present invention can accordingly be described as being directed to modifications in the tape configuration to obtain improvements in protecting pipewrap against degradative environmental forces for a given adhesive system.

BRIEF DESCRIPTION OF THE INVENTION

In accordance with the present invention, the aforementioned task is solved in a simple and elegant manner by tapering opposed edges of the tape from the adhesive surface (underside) towards its backing sheet (outer surface).

BRIEF DESCRIPTION OF THE DRAWINGS

FIG. 8 is a sectional view of a portion of the wrapped pipe of FIG. 6; and

FIG. 9 is a similar view of a portion of the wrapped pipe of FIG. 7 in accordance with this invention.

DETAILED DESCRIPTION OF THE INVENTION

Figure 1:
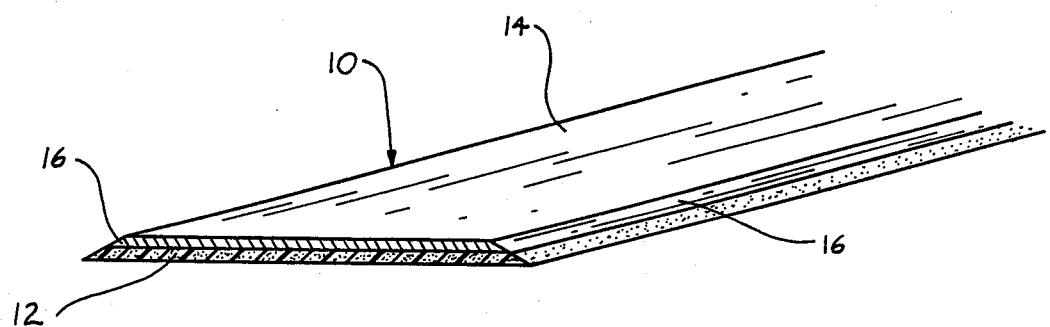
FIG. 1 is a perspective view of a portion of adhesive tape in accordance with the invention.

As mentioned previously, the present invention relates to adhesive tapes such as those heretofore employed for providing an anti-corrosion protective outer wrap for metal articles, e.g. pipes or other tubular objects. It is particularly directed to protective wraps for pipes destined for inground implantation.

Tapes of this description commonly employed in industry consist essentially of an adhesive surface adapted for adhesion or lamination to the pipe surface; and an impermeable outer surface. Typically, they may be on the order of 5–120 mils thick with a width from about one to forty inches, and may be described as comprising an impermeable backing having and adhesive layer, e.g. a pressure-sensitive adhesive coated on one side thereof.

Useful backing sheets heretofore employed include polyolefins such as low to high density polyethylene, polypropylene, etc; polyvinyl chloride, polyethylene vinyl acetate, elastomers such ad EPDM (artificial rubber terpolymer of ethylene, propylene and a diene monomer), neoprene, and the like.

As examples of adhesives which are typically employed, mention may be made of rubber=based adhesives, acrylic adhesives, mastic compounds of asphalt, coal tar, bitumen, etc., rubber-based adhesives being particularly efficacious. A typical rubber-based adhesive will for example include a blend of virgin butyl rubber, reclaimed butyl rubber, tackifier, filler and various other components performing specific desired functions, e.g. antioxidants, bactericides, crosslinking agents, etc.

In manufacture of the tape, the adhesive coating may be applied to the backing by calendering or other known coating techniques. In any event, the coated sheets are then advanced to a slitter station where a slitter knife positioned at right angles to the plane of the advancing sheet then cuts the sheet to the desired width, e.g. three or four inches, after which it is rolled onto a core to provide a roll of tape.

When the tape is wound over the surface of a pipe, an overlap area is created where the thickness of this overlap area is equal to twice the thickness of the tape. The overlap runs a spiral path along the length of the pipe, and the presence of this spiral overlap poses three problems which may compromise the protective function of the tape over the pipe surface:

(1) the thickness differential projected at the surface of the overlap results in increased frictional resistance when the pipe moves against the soil and/or against any support skids, which high frictional resistance may result in a failure of the overlap bond and/or wrinkling of the tape, thereby ultimately permitting diffusing liquid to corrode and damage the pipe;

(2) the thickness differential at the underside (bottom) of the overlap results in the formation of an interstice at the termination of the lower adherent (tape wound closest to the pipe), which interstice running along the length of the pipe as a spiral is called "the spiral void," the presence of which eventually results in corrosion of the metal pipe; and (3) when the protective tape is subjected to the action of soil stresses and application tension (residual stresses), the overlap bond is pulled apart; severe cleavage stresses are induced at the terminal points of the overlap when it is pulled apart in this fashion, causing a stress concentration on the overlap edges which may result in failure of the overlap bond.

In accordance with the present invention, the aforementioned problems are substantially reduced if not entirely precluded by tapering the opposed edges of the tape from the coated underside towards the outer backing surface in a manner to be described in detail hereinafter.

Tapering the opposed edges rather than employing the conventional straight or 90° cut through the thickness of the tape has been unexpectedly found to provide very significant improvements in the protective pipe-wrap.

With the tapered edges, a gradually increasing profile is projected which in turn provides materially lower frictional resistance. Secondly, with the edge taper, the aforementioned sudden discontinuity at the termination of the lower adherent is replaced with a gradually conforming upper adherent which lies over the tapered edge of the lower adherent and merges smoothly with the contour of the pipe surface. As will be illustrated subsequently in the discussion of the drawings, this geometry reduces the size of the spiral void substantially if not fully. Additionally, the tapered overlap geometry provides substantial reduction of stress concentrations and more uniform distributions of stresses along the overlap.

For a more detailed explanation of the present invention, reference is now made to the accompanying drawings.

As illustrated in FIG. 1, a novel tape 10 of this invention is shown to have an adhesive layer 12 laminated to to side of backing layer 14. The edge portions 16 of the tape are tapered throughout the length, i.e. from the leading end of the tape to the trailing end (not shown).

The degree of taper which may be employed may vary. At least some beneficial results may be obtained with an angle of the taper as great as 40°. However, for optimum results, the degree of taper should be no greater than 22°. As will be appreciated, the minimum angle of taper is in part dependent upon the thickness of the tape. That is to say, the smallest degree of taper reasonably obtainable is directly proportional to the thickness of the tape. While this thickness, may for example vary from on the order of 5 mils to on the order of 120 mils, it would be extremely difficult if not impossible to provide a relatively small angle of taper on say, a 5 mil tape. Conversely, this would be quite easy on, say, a 120 mil thick tape. Consequently, it is not possible to state quantitatively the smallest degree of taper without stating the thickness of the tape. It can be however, be stated as a general proposition that for optimum results, the degree of taper to be employed would generally be in excess of about to 10 to the horizontal. To achieve this taper, at least with conventional production equipment, tape 10 should preferably have a thickness of at least 25 mils.

Figure 5:
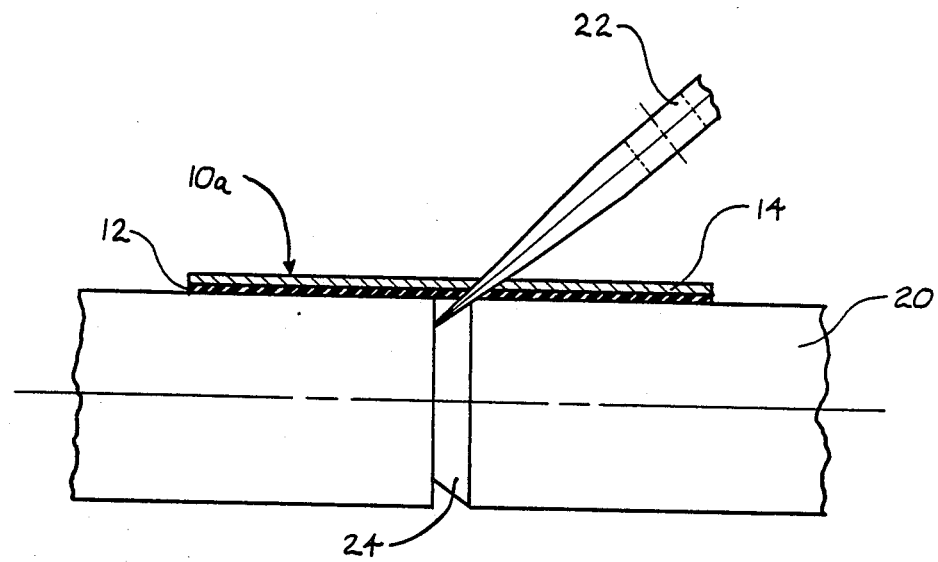
FIG. 5 is a sectional view further illustrating the tapering step.
Figure 4:
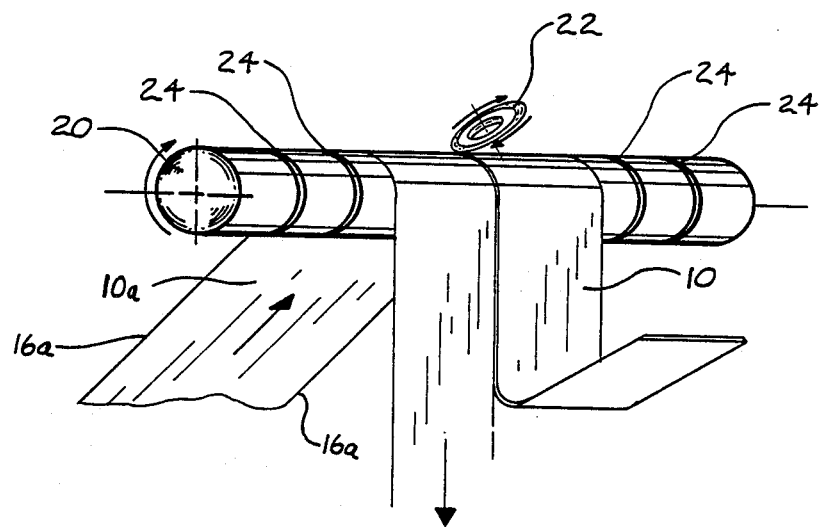
FIG. 4 is perspective view illustrating the manufacturing step for providing the tapered edge.

FIGS. 4 and 5 illustrate a preferred method for achieving the desired degree of tape with standard production equipment.

With reference thereto, a knife 22 with adjustable angle is positioned on a rotatable shaft (not shown) at the desired angle.

A web of adhesive tape 16a having standard straight edges is advanced beneath knife 22 onto a rotating roller 20 provided with a series of spaced grooves 24. Knife 24 is positioned over one of these grooves preselected according to the desired width for the tape. Following the cutting or slitting operation, the cut portions of web 16a are then advanced to a roll-up operation.

As shown in FIG. 5, the web 10a is slit with the adhesive side down or against roller 20. While not critical to the practice of this invention, this positioning of the web is preferred due to the shearing and drawing action which occurs simultaneously during the slitting process.

In the embodiment shown, only a single knife 22 has been shown for purposes of illustration. With reference to FIG. 4, this will of course only provide a taper on one edge, e.g. the left side of tape 10. To achieve tapering on both edges, a second knife angled in the opposite direction need to be employed. Knife 22 is shown in what may be termed the "mid=splitting" position, namely between the two edges of web 10a. If the left side of the slit web (as one views the drawing) is also to be used in the practice of this invention, the taper is in reverse (wrong) direction. Consequently, an additional knife angled in the opposite direction from the knife shown need be employed. It will be ppreciated that the two adjacent knives should be positioned as close together as possible to minimize waste, i.e. the material slit between the two knives. In actual practice, this waste has been kept as low as an eighth of an inch.

Figure 2:
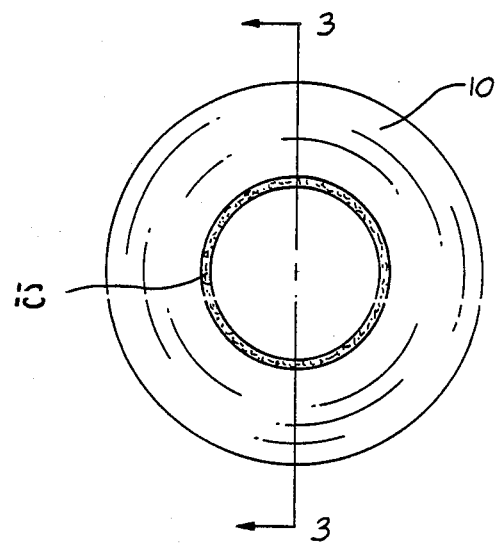
FIG. 2 is a top plan view of a roll of the tape of FIG. 1 wound on a central core in a conventional manner.

Following the slitting operation, the tape 10 may be wound onto a core 18 as shown in FIG. 2 to provide a roll of tape of desired length ready to be employed in the pipewrapping operation.

Figure 3:
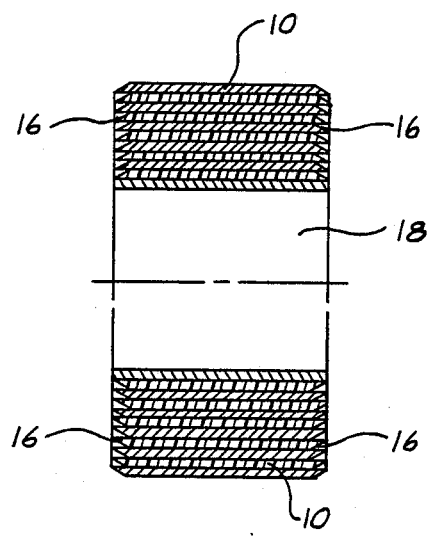
FIG. 3 is sectional section view taken along lines 3—3 of FIG. 2.

FIG. 3 illustrates another advantage of the present invention which is manifested primarily during storage of the tape. As shown, because of the taper, small spaces provide a well or reservoir for the small amount of adhesive mass which occasionally tend to diffuse and exude, particularly with storage at elevated temperatures. With the conventional straight cut tapes, these exuded "sticky" spots tend to be some what objectionable in the handling and pipewrapping operations.

Figure 6:
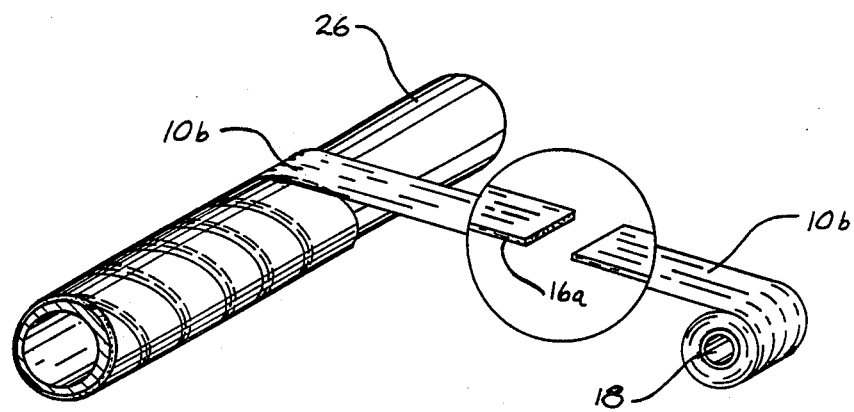
FIG. 6 is a perspective view of a pipe being wrapped with a roll of tape of the prior art having perpendicular edge thickness, the broken portion in the circle being enlarged for clarity.
Figure 7:
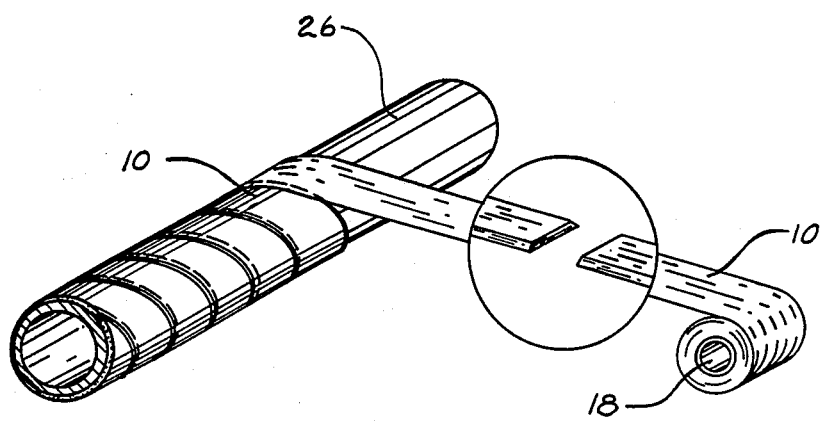
FIG. 7 is a similar view of a pipe wrapped with the novel tape configuration of this invention.

FIGS. 6 and 7 illustrate the pipewrapping step with the prior tapes and those of the present invention, respectively.

As shown in FIG. 6, a prior tape 10b having straight edges 16a is spirally wound over a length of pipe 26. [In commercial usage, this is accomplished with a pipewrap machine (not shown) which advances the pipe to a roll or web of tape angled so as to be uniformly wound spirally around the moving pipe.]

FIG. 7 is a similar view illustrating the wrapping of a tapered tape 10 of this invention around a length of pipe.

FIG. 8 is a sectional view illustrating the wrapping of a tapered tape 10 of this invention around a length of pipe.

FIG. 8 is a sectional view showing a portion of the pipe wrapped with the prior straight cut tape, as illustrated in FIG. 6. This figure clearly illustrates the undesired spiral void 20 which was previously discussed.

In FIG. 9, which is a similar view of a pipe wrapped with the tapered tape of this invention, the spiral void will be seen to a very markedly smaller.

The following examples show by way of illustration and not by way of limitation the practice of this invention.

EXAMPLE 1

A pair of circular score knives [as shown in FIG. 4 were position angled towards each other at about 55 degrees to the horizontal over respective grooves on the splitter roll approximately 0.08 inch deep and 0.1 inch wide. The respective knives and grooves were spaced from each other so as to provide a tape having tapered edges with the wider surface width measuring three inches. A web of 30 mil thick pipewrap tape consisting of a pressure-sensitive rubber-based adhesive coted on a polyethylene backing was advanced onto a roll beneath the knives with the adhesive side down while applying a pneumatic pressure of about 80 psi to provide a three inch pressure sensitive tape whose edges possessed an approximately 18 degree taper angle to the horizontal (1:3 ratio). The resulting tape was wound up on a core ( as shown in FIG. 2) as it is advanced through the slitter.

In the foregoing example, an 18 degree taper was provided. However, as mentioned previously, the use of smaller taper angles was found to provide even more enhanced improvements in overlap behavior.

For example, taper angles at 10 degrees (1:6 ratio) or smaller may be obtained utilizing grooves with less depth and more width than described above along with higher blade pressures.

It is pointed out that with increased drawing action at the tape edges and shallower angels, a scalloped taper geometry may be obtained. This scalloped tape geometry is considered to be more desirable in terms of the results which are the task of the invention.

The following example illustrates the comparative coefficients of friction of standard straight-cut vs tapered pipewraps under simulated inground implantation.

EXAMPLE 2

For comparison, a standard four inch 30 mil tape (control) and an identical tape of this invention (test) which had been manually tapered, using a template, to an average taper angle of 22° were employed. Using a standard pipewrap machine, the control (standard) tape was spirally wound on one two inch diameter steel pipe; and the test (tapered) tape was spirally wound on a similar pipe. The control and test pipewraps were subject to testing in a soil-stress apparatus attached to an Instron universal testing machine to evaluate the coefficient of friction under simulated inground conditions. In order to do so, Ottowa sand was employed to simulate inground soil. The sand was pressurized against the wrapped pipe surface radially and the axial force required to move the pipe axially at different soil temperatures was determined. Experimental results indicated that the coefficient of friction was reduced as much as 47%.

The results of these test at the indicated temperatures is set forth in the following table.

TABLE 1

| SOIL TEMP (C.°) | CONTROL | TEST | IMPROVEMENT (%) |
|---|---|---|---|
| 20 | 0.426 | 0.347 | 12 |
| 40 | 0.470 | 0.249 | 47 |
| 70 | 0.354 | 0.192 | 46 |

EXAMPLE 3

The test procedure employed in Example 2 was repeated utilizing a different pipewrap system. A 20 mil thick polyethylene backing tape of standard type was first wrapped around each other of two two inch diameter pipes. A 30 mil 18° tapered tape as prepared in Example 1 (test) was then wrapped over this inner wrap on one of these pipes; and a 30 mil straight cut similar tape (control) was wound over the other. Readings were taken at temperatures 21°;30°;40°;and 50°. The coefficient of friction was reduced in all instances with reductions as great as 42% being obtained with the test tape.

The results of this test are set forth in the following table:

TABLE 2

| SOIL TEMP (C.°) | CONTROL | TEST | IMPROVEMENT (%) |
|---|---|---|---|
| 21 | 0.541 | 0.415 | 23 |
| 30 | 0.518 | 0.411 | 21 |
| 40 | 0.476 | 0.385 | 19 |
| 50 | 0.556 | 0.324 | 42 |

The following example illustrates the reduction in spiral void obtainable by the present invention.

EXAMPLE 4

Two-inch diameter metal pipes were shot blasted and then wrapped (without a primer coat) as follows: one was wrapped with a standard straight cut tape, the other with an 18° taper. The tape was then partially unwrapped to reveal the previously wrapped adhesive surface. The imprint of the metal surface on the adhesive surface appeared grainy. On the other hand, the portion of the adhesive which was overwrapped on the (polyethylene) backing of the tape rather than the pipe surface appeared smooth. The spiral void was measured as the distance between the imprint of the metal surface (grainy imprint on the adhesive surface) and the smooth adhesive surface. [The section of unwrapped adhesive corresponding to the spiral void was quite visible for measurement.] The spiral void with the standard wrap measured about 0.191 inch; and the spiral void with the taper was about 0.077, indicating a reduction in spiral void of about 60%.

For the foregoing description and illustrative examples, it will be seen that the present invention, wherein opposed edges of the tape are tapered, provides very significant advantages in the protective pipewrap.

Since certain changes may be made without departing from the scope of the invention herein described, it is intended that all matter contained in the foregoing description, including the examples, shall be taken as illustrative and not in a limiting sense.

What is claimed is:

1. An adhesive tape for wrapping metal objects comprising a substantially rectangular polyolefinic sheet material having opposed lateral edges and leading and trailing ends, said sheet material carrying a rubber-based pressure-sensitive adhesive coating on one surface thereof, said lateral edges being tapered from the surface of said adhesive coating inwardly towards the opposed surface of said sheet material.

2. An adhesive tape as defined in claim 1 wherein the degree of taper along each said lateral edge is substantially the same, said degree of taper being no greater than about 40 degrees.

3. An adhesive tape as defined in claim 1 wherein the degree of taper along said lateral edge is no greater than about 22 degrees.

4. An article of commerce comprising a metal pipe having a protective coating system surrounding the outer surface thereof, said system comprising an adhesive tape spirally wound over the outer surface of said pipe with edge portions of said tape overlapping, said tape consisting essentially of a sheet material carrying on the inner surface thereof a pressure-sensitive adhesive coating adapted to adhere directly to the metal surface of said pipe or indirectly to an intermediate layer adhered to said pipe, said adhesive tape being a tapered tape as defined in claim 1, the degree of taper being sufficient to lower materially the spiral void running along the length of said spirally wrapped pipe.

5. An article as defined in claim 4 wherein the degree of taper is sufficient to lower the frictional resistance between said tape and the surrounding soil when said pipe is laid in the ground.

6. An article as defined in claim 4 wherein the degree of taper along each said lateral edge is substantially the same, said degree of taper being no greater than about 40 degrees.

7. An article as defined in claim 4 wherein the degree of taper is no greater than about 22 degrees.

8. An article as defined in claim 4 including a primer coating applied to the surface of said metal pipe.

9. An article as defined in claim 8 wherein said adhesive is a rubber-based adhesive adhered to said primer coating.

10. An article as defined in claim 4 including a second adhesive tape spirally wound around said pipe intermediate to said pipe and said first-mentioned tapered adhesive tape.

11. An adhesive tape for wrapping metal pipes which is substantially rectangular in configuration having leading and trailing ends and opposed lateral edges extending between said ends said tape comprising a water-impermeable polyolefinic sheet material carrying on one surface thereof a rubber-based adhesive coating adapted to adhere to said pipe directly or through an intermediate layer, each of said edges being tapered from the surface of said coating inwardly toward the opposed surface of said sheet material, the degree of tapering along each said edge being sufficient to lower the frictional resistance between said tape and the surrounding soil when said pipe is laid in the ground when wound spirally around said pipe from the frictional resistance obtained when a like tape having perpendicular edges is spirally wound around said pipe.

12. An adhesive tape as defined in claim 11 wherein the thickness of said tape is at least twenty mils.

13. An adhesive tape as defined in claim 12 wherein the angle of taper is no greater than about 22 degrees from the horizontal.

* * * * *